March 14, 1967 JEAN-PIERRE VASSEUR 3,309,509

SYSTEM FOR CHECKING THE RANDOM CHARACTER OF SEQUENCES OF N SYMBOLS

Filed May 9, 1963 3 Sheets-Sheet 1

March 14, 1967 JEAN-PIERRE VASSEUR 3,309,509
SYSTEM FOR CHECKING THE RANDOM CHARACTER
OF SEQUENCES OF N SYMBOLS
Filed May 9, 1963 3 Sheets-Sheet 2

March 14, 1967 JEAN-PIERRE VASSEUR 3,309,509

SYSTEM FOR CHECKING THE RANDOM CHARACTER OF SEQUENCES OF N SYMBOLS

Filed May 9, 1963 3 Sheets-Sheet 3

United States Patent Office 3,309,509

Patented Mar. 14, 1967

3,309,509

SYSTEM FOR CHECKING THE RANDOM CHARACTER OF SEQUENCES OF N SYMBOLS

Jean-Pierre Vasseur, Paris, France, assignor to CSF—Compagnie Générale de Télégraphie Sans Fil, a corporation of France Filed May 9, 1963, Ser. No. 279,194
Claims priority, application France, May 10, 1962, 897,078, Patent 1,330,284
7 Claims. (Cl. 235—177)

The present invention relates to ciphering machines.

More particularly, it is an object of the invention to provide a system for detecting anomalies in the operation of ciphering machines which are of a nature to affect the random character of this operation and may result in making the ciphered data more easily decipherable by making the ciphering key no longer thoroughly random.

The system according to the invention comprises means for permanently obtaining a statistics of the outputs of the key generator and means for indicating any anomalous discrepancy between these statistics and the values derived from the probability theory as applied to entirely random events.

The invention will be best understood from the following description and appended drawings, wherein.

Figure 1:
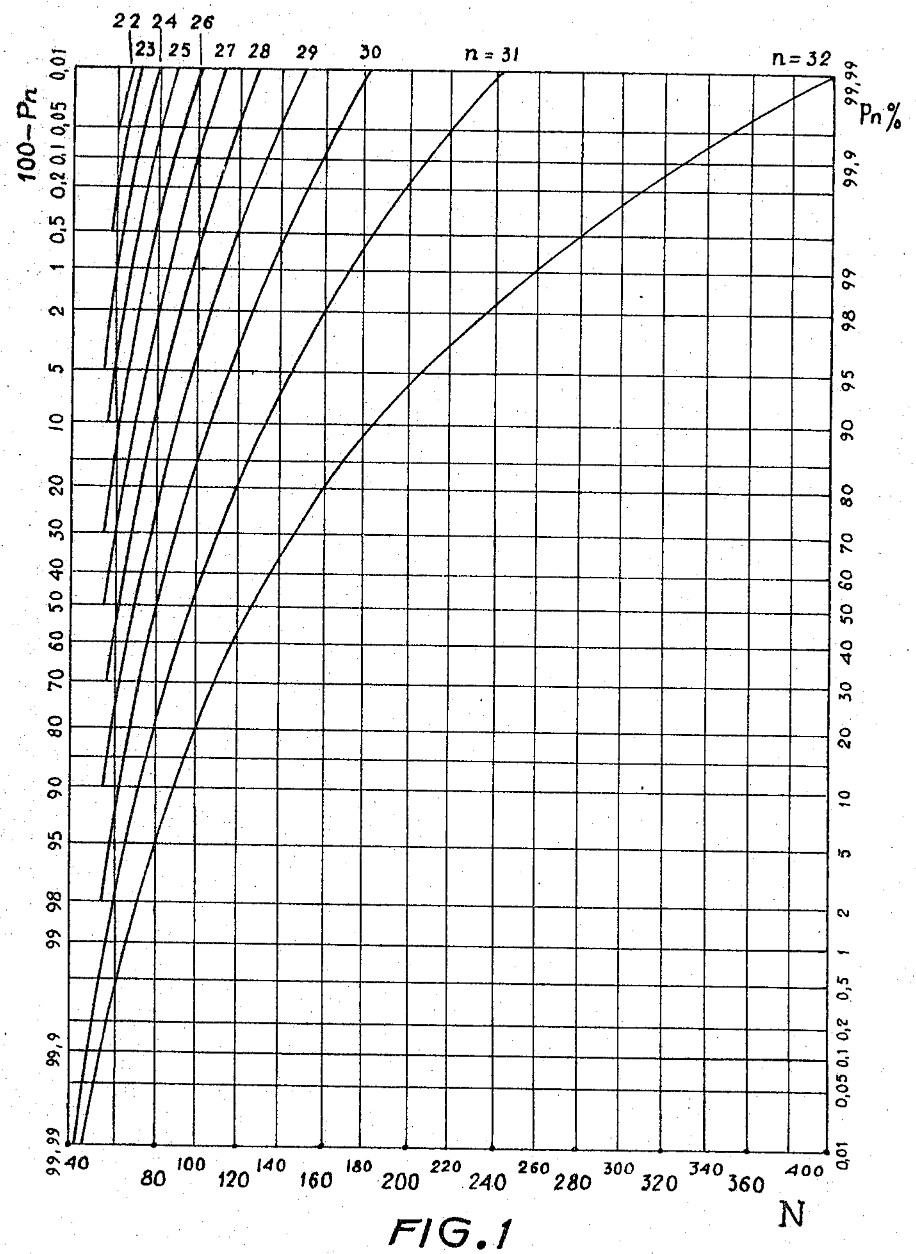
FIG. 1 represents probability curves illustrating a purely random operation of a key generator to which the invention is applicable.

FIG. 1 shows the curves indicating the probability in percent of obtaining at the output of a key generator a given number $n$ of different letters or symbols, selected among the 32 letters which may be delivered by this key generator, in the course of a given number N of operations thereof. The curves, which are drawn for different values of $n$ as a function of N, are theoretical, i.e. correspond to an entirely random operation of the key generator. What is desired is that the actual operation of the key generator should not depart, to a substantial degree, from the theoretical operation as expressed by these curves.

Figure 2:
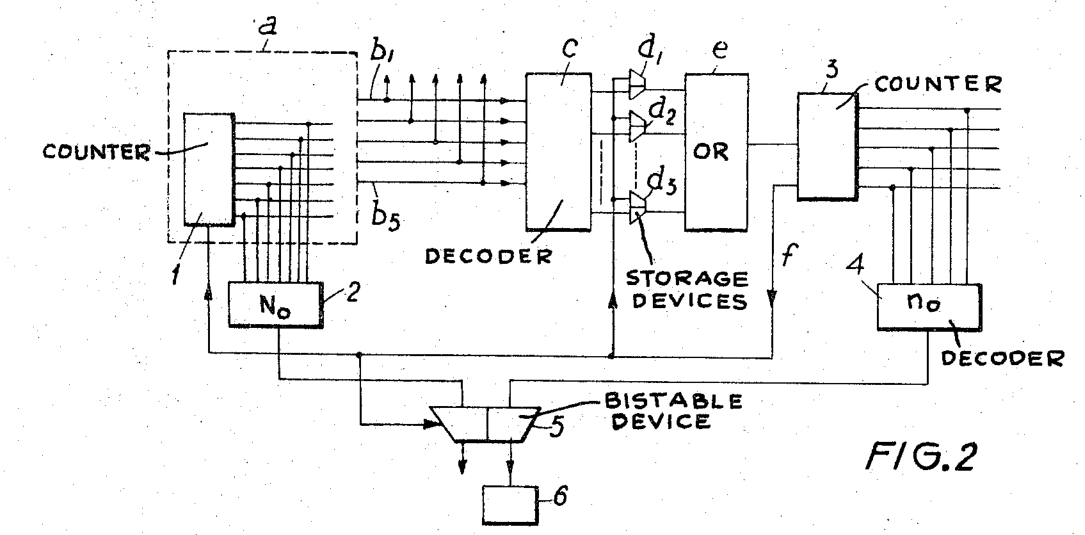
FIG. 2 is a block diagram of a system according to the invention.

FIG. 2 shows how the operation of a key generator, for example of the type described in the copending patent application Ser. No. 127,171, filed July 27, 1961, by the applicant, can be checked according to the invention in this respect.

Such a generator comprises several binary advance counters, one of which, for example that providing the highest count, is shown at 1. The key generator delivers at its output wires $b_1$ to $b_5$, one of 32 letters, i.e. a number of letters equal to that of the combinations which may be obtained by means of five binary digits.

The system according to the invention checks the number $n$ of different letters appearing among N successive letters provided by the key generator.

In the embodiment of FIG. 2, the different letters are counted by a counter 3 which is coupled to outputs $b_1$ to $b_5$ through a decoder $c$, storage devices $d_1$ to $d_{32}$, numbered from 1 to 32, and an OR-gate $e$. Decoder $c$ provides a signal at that one of its 32 outputs, whose number corresponds to the binary number represented by the digits appearing at outputs $b_1$ to $b_5$. The 32 outputs of decoder $c$ are respectively connected to the inputs of the 32 storage devices $d_1$ to $d_{32}$, such as for example multivibrators, the outputs of which are connected in parallel to the input of the OR-gate $e$ which drives the binary counter 3. When the count of counter 3 starting from its maximum count 31, reaches count 0, a signal appears on a wire $f$ for resetting into their zero position the 32 storage devices $d$. A storage device $di$ is tripped from one state to the other upon the energization of the corresponding output of decoder $c$ for the first time, thus producing a signal transmitted by gate $e$ to counter 3, which then advances by one step. If the same output wire of decoder $c$ is energized again, device $di$ will remain in the same state and will pass no signal to gate $e$. Accordingly nothing will happen.

Counter 3 will thus advance by one step each time the key generator generates a letter, which did not yet occur since the assembly of storage devices $d_1$ to $d_{36}$ has been reset into their zero position.

As shown in FIG. 2, the signal appearing on wire $f$ also resets to zero counter 1 and a multivibrator 5, the function of which will be described later.

For clarity, all the operations taking place between the appearance of two zero-resetting signals on wire $f$ will be called a "ciphering cycle."

It is also possible to obtain the signal resetting to zero the storage devices $d_1$ to $d_{32}$, counter 3 and multivibrator 5, in another manner, for example from counter 1, once it has passed from its maximum count to zero.

According to the invention, the binary signals derived from counter 1 are applied to the input of a decoder 2, which is arranged for providing a signal, each time the count of counter 1 reaches a predetermined value $N_0$.

In the embodiment of the key generator described in the above mentioned copending patent application, each advance of counter 1 corresponds to the provision at the output of the key generator of a letter. Accordingly, decoder 2 will provide a signal when the key generator has produced $N_0$ letters during the ciphering cycle considered.

As to the binary signals derived from counter 3, they are applied to the input of a decoder 4 to produce a signal each time the count of counter 3 has reached a predetermined value $n_0$. The key generator will at this moment have produced $n_0$ different letters during the ciphering cycle considered.

The output of decoders 2 and 4 are respectively applied to the two inputs of a bistable multivibrator 5, one of the outputs of which actuates an alarm and/or a control device 6, which stops the operation of the cryptographic machine. This multivibrator is reset to zero by the signal appearing on the wire $f$ at the beginning of each ciphering cycle.

The operation of the system described is as follows:

At the beginning of each ciphering cycle, multivibrator 5 is set in the zero state, i.e., in the case of the FIG. 2, its left-hand portion is conductive. The arrangement is such that the multivibrator will be still in this state at the end of the cycle, if the signal from decoder 4 precedes that from decoder 2. In this case, no signal is transmitted to device 6 during the cycle considered. In the contrary case, a signal is transmitted to device 6 during the cycle considered. This device 6 comprises means for starting an alarm and/or for stopping the machine each time a signal has been transmitted thereto.

Conversely, it is possible to reverse the connections of multivibrator 5 to decoders 2 and 4 so as to obtain an alarm signal, if the signal from decoder 2 follows that from decoder 4. Selecting, for example, $N_0=50$, $n_0=32$, it will be seen in FIG. 1 that the probability for the 32nd different letter to appear after the production of 50 key letters is about 0.05%. In this case, the signal from decoder 2 should follow that from decoder 4 and the alarm is operated in the contrary case.

The reverse situation prevails if one selects, for example, $N_0=120$ and $n_0=28$. The probability that the 28th different letter will appear, after 120 letters have been generated by the key generator, is about 99.95%, so that the signal from decoder 4 must precede that from the decoder 2, if the operation is correct.

It is possible to start the alarm signal directly through multivibrator 5 according to the state thereof at the end of each cycle, the values of $N_0$ and $n_0$ being then so selected that the operation of the alarm device should have a very low probability when the key letter are random.

It is also possible to select $N_0$ and $n_0$ for a higher, although not too high, theoretical probability of the tripping of multivibrator 5, but to arrange for the alarm to operate only if this tripping occurs often enough.

Figure 3:
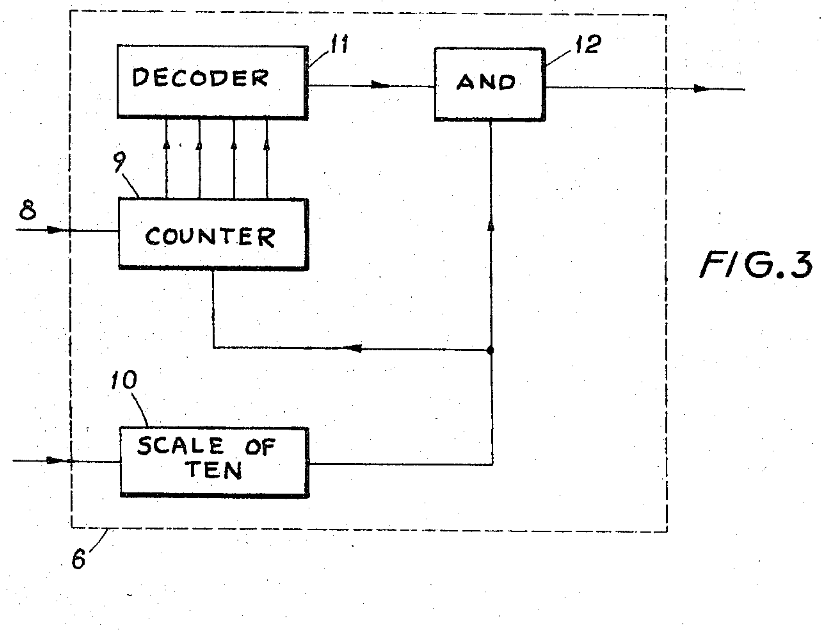
FIGS. 3 and 4 show two embodiments of portions of the system illustrated in FIG. 2.

This latter method is applied in the embodiment shown in FIG. 3. It is desired to intervene, for example, only when, during ten ciphering cycles, device 6 has received four signals at its input 8 connected to multivibrator 5.

This situation may have, for example, the following signification: the curves of FIG. 1 show that, at the hundreth advance of counter 1 there is about 0.7 chance in a hundred for less than 28 different letters to appear at the output of the ciphering machine. If the system of FIG. 2 is adjusted so that $N_0=100$ and $n_0=28$, there is a very small probability that, in any ten successive ciphering cycles of the machine, the device 6 will receive four alarm signals. If this occurs, this fact may be considered as indicative of the existence of an important anomaly.

The embodiment of system 6 shown in FIG. 3 comprises a counter 9 and a scale of ten 10.

The input of counter 9 is connected to terminal 8, whereas its four outputs are connected to a decoder 11.

The scale 10 receives one pulse for each ciphering cycle and delivers, each time its count passes from nine to zero, a pulse which resets to zero counter 9 and a pulse to an AND-gate 12. The second input of gate 12 is connected at the output of a decoder 11 and its output controls a device providing an alarm signal and/or stopping the machine.

Decoder 11 is arranged for providing an output signal each time the count of counter 9 is higher than 4. This signal is passed to gate 12, when scale 10 passes from nine to zero.

Figure 4:
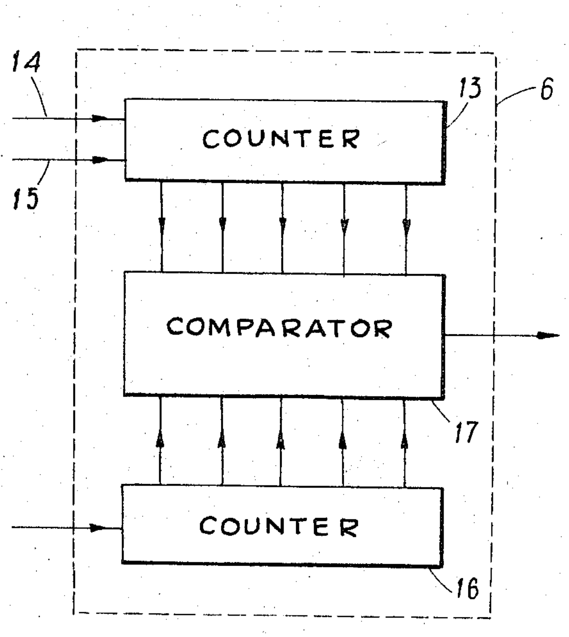

In FIG. 4 there is shown an embodiment of device 6 adapted for checking the operation of the key generator for values corresponding to the points of the curves of FIG. 1 where the probability of the tripping of multivibrator 5 is neither very great, nor very small.

The arrangement of FIG. 4 comprises a reversible decimal counter 13, including a counting input 14 and a down-counting input 15, which are respectively connected to the two outputs of multivibrator 5 of FIG. 2; a counter 16 which receives one pulse per ciphering cycle; and a comparator 17 which is connected to the outputs of counters 13 and 16.

Comparator 17, which is of a known type, compares the counts $n_1$ and $n_2$ of counters 13 and 16. It delivers an alarm signal when $n_1>kn_2$, k being a constant predetermined number.

Counter 16 generates, as will be shown later, a signal which, at each instant, is approximately proportional to $\sqrt{Q}$, say $n_2=\alpha\sqrt{Q}$, Q being the number of pulses applied to its input. This relation corresponds to the standard deviation according to the Gaussian probability law.

Decoders 2 and 4 of FIG. 2 are arranged for providing a pulse when their respective counts N and $n$ reach values $N_0$ and $n_0$, which are so preselected that the probability of having $n>n_0$ when $N=N_0$ is neither too high nor too low, and is, for example, comprised between 0.2 and 0.8; $n_1$ represents therefore the difference between the number of cases where $n>n_0$, when $N=N_0$ and that for the cases when $n<n_0$, when $N=N_0$.

On the other hand $n_2=\alpha\sqrt{Q}$.

The alarm is thus produced when $n_1>k\alpha\sqrt{Q}$; $k$ is predetermined taking into account the theoretical probability, and the accepted probability for not having the alarm given in case of a failure or of having it given in the absence of any failure.

Figure 5:
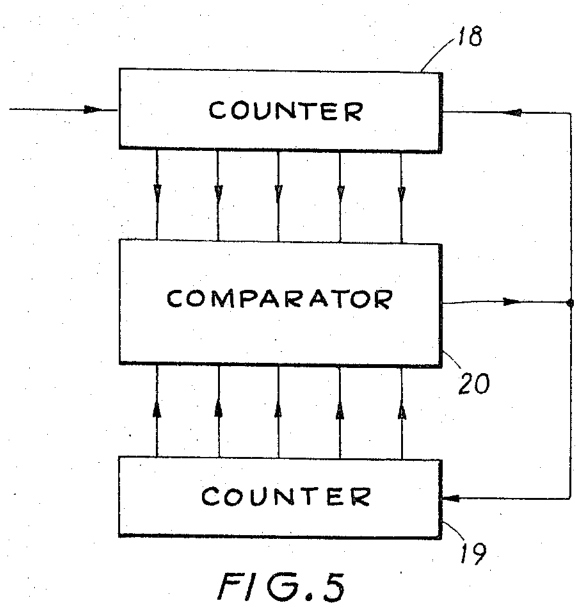
FIG. 5 is a square-root computer adapted to be used in the system of FIG. 4.

An embodiment of the system which computes Q is shown in FIG. 5. It comprises two counters 18 and 19, the outputs of which are applied to a comparator 20.

Counter 18 receives the pulses and what is desired, is to compute at each instant the square-root of the number Q of the pulses it has received since the preceding resetting to zero.

A comparator 20 generates a signal each time the counts of the computers 18 and 19 are equal. The output signal of comparator 20 is applied to counter 18, which it resets to zero, and to counter 19, which it advances by one step.

Since both counters 18 and 19 are set at zero at the starting, i.e. have the same count comparator 20 produces a signal which causes the count of counter 19 to pass to 1. Upon reception of a pulse counter 18, advances by one step and its count passes from 0 to 1. The counts of counters 18 and 19 become again identical and comparator 20 will again generate a signal. This signal causes the count of counter 19 to pass to count 2 and resets the counter 18 to zero. It is only when counter 18 has received two further pulses that the counts of counters 18 and 19 are equal again and that counter 18 is reset to zero whereas the count of counter 19 becomes equal to 3. It will be seen that counter 19 will display count $q$ when the number Q of the pulses applied to counter 18 has been:

$$1+2+3+\ldots q$$

This sum is with a sufficient approximation, equal to $q^2/2$ i.e.

$$Q \# q^2/2$$

and $$q \# \sqrt{2}\cdot\sqrt{Q}$$

The count of counter 18 is thus Q, to within a factor $\alpha=\sqrt{2}$.

Of course the invention is not limited to the embodiments described and shown which were given solely by way of examples. In particular the invention is not limited to key generators but is applicable each time it is desired to check the random character of one or more sequences of symbols.

What is claimed is:

1. A system for checking the random character of sequences of N symbols comprising: means for providing a signal each time a given symbol appears for the first time within one of said sequences; first means for counting said signals to provide a first count; second means for counting said symbols to provide a second count; and bistable means, responsive to said first and second means, for providing a signal when a predetermined one among said counts is greater than the other.

2. A system for checking the random character of sequences of N symbols, coded in a given code, comprising: means for decoding said symbols, said means having an output; means for providing a signal each time a given decoded symbol appears at the output of said decoding means for the first time within each sequence; first means for counting said signals to provide a first count; second means for counting said symbols to provide a second count; and bistable means, responsive to said first and second means, for providing a signal when a predetermined one among said counts is greater than the other.

3. A system for checking the random character of sequences of N symbols coded in a given code comprising: means for decoding said symbols, said means having an output; means respectively responsive to said decoded symbols for providing a signal each time a given decoded symbol appears at said output for the first time within one sequence; first means for counting said signals to provide a first count; second means for counting said symbols to provide a second count; and bistable means, responsive to said first and second means for providing a signal when a predetermined one among said counts is greater than the other.

4. A system for checking the random character of sequences of N symbols comprising: means for providing a signal each time a given symbol appears for the first time within each sequence; first means for counting said signals to provide a first count; second means for counting said symbols to provide a second count; bistable means, controlled by said first and second means, for providing a further signal when a predetermined one among said counts is greater than the other; means for counting said sequences to provide a third count; means for counting said further signals to provide a fourth count; and means for providing a signal for a predetermined ratio of said third and fourth counts.

5. A system for checking the random character of sequences of N symbols comprising: means for providing a signal each time a given symbol appears for the first time within one sequence; first means for counting said signals to provide a first count; second means for counting said symbols to provide a second count; bistable means, controlled by said first and second means, for providing a further signal when a predetermined one among said counts is greater than the other; a counter for counting said further signals; a further counter for counting said sequences; means for resetting to zero said counter upon said further counters reaching a predetermined count; and an AND-gate having two inputs respectively responsive to said further counter and to said counter upon its reaching a predetermined count.

6. A system for checking the random character of sequences of N symbols comprising: means for providing a signal each time a given symbol appears for the first time within one of said sequences; first means for counting said signals to provide a first count; second means for counting said symbols to provide a second count; bistable means having two outputs controlled by said first and second means for providing a signal at one or the other of said outputs according to whether a predetermined one among said counts is greater than the other; a counter having a counting and a down counting input respectively connected to said outputs; a further counter for providing a count proportional to the square root of the number of said sequences; and means for comparing the counts of said counter and of said further counter.

7. A system according to claim 6, wherein said further counter comprises: a first counter for counting said other count; a second counter; a comparator arranged for comparing the counts of said first and second counters and for providing a signal each time their counts are equal; and means for resetting to zero said first counter and for advancing by one step said second counter each time said signal is provided.

References Cited by the Examiner

UNITED STATES PATENTS

| | | | |
|---|---|---|---|
| 2,949,228 | 8/1960 | Bailey et al. | 235—92 |
| 2,964,242 | 12/1960 | Brown et al. | 235—158 |
| 3,049,296 | 8/1962 | Hertz et al. | 235—158 |
| 3,091,392 | 5/1963 | Arya | 235—177 |
| 3,124,677 | 3/1964 | Miller | 235—177 |

MALCOLM A. MORRISON, *Primary Examiner.*

M. S. SPIVAK, *Assistant Examiner.*